Aug. 27, 1946.  R. W. LESLIE  2,406,696
MILK BOTTLE ATTACHMENT
Filed June 5, 1943

INVENTOR
ROY W. LESLIE

BY
Edward M. Apple
ATTORNEY

Patented Aug. 27, 1946

2,406,696

UNITED STATES PATENT OFFICE 2,406,696

MILK BOTTLE ATTACHMENT

Roy W. Leslie, Detroit, Mich.

Application June 5, 1943, Serial No. 489,853

1 Claim. (Cl. 215—100)

This invention relates to household devices and has particular reference to attachments for use in connection with milk bottles and the like.

An object of the invention is the provision of a carrying handle for a milk bottle which may readily be attached to and removed from the bottle.

Another object of the invention is the provision of a device of the character referred to which has means adapted for removing a bottle cap.

Another object of the invention is the provision of a device of the character referred to which is simple in construction, economical to manufacture and highly efficient in operation.

The foregoing objects and other advantages of the invention will become more apparent as the description proceeds, reference being made to the accompanying drawing forming part of the disclosure in which.

Figure 2:
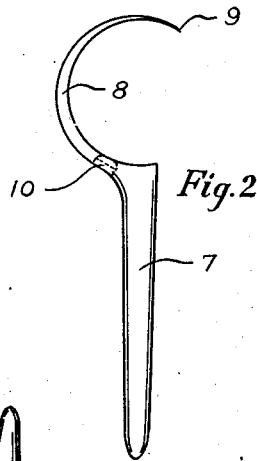
Fig. 2 is a top plan view of the device illustrated in Fig. 1.
Figure 3:
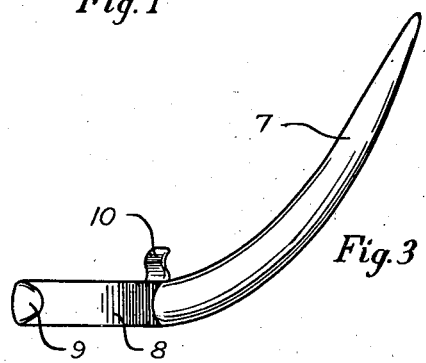
Fig. 3 is an enlarged inverted elevational view of the device shown in Fig. 1.
Figure 4:
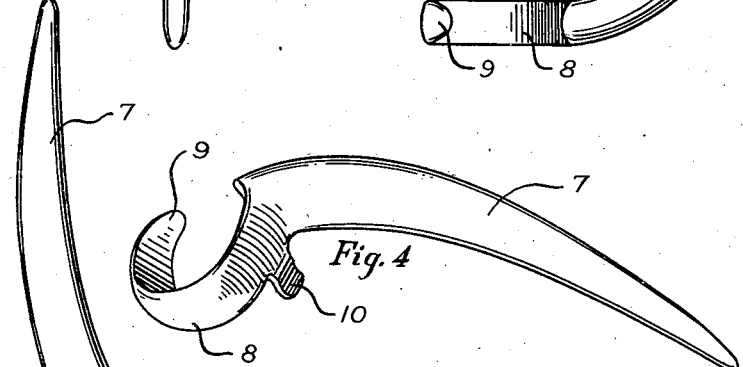
Fig. 4 is an enlarged perspective view of the device.

Referring now more particularly to the drawing, it will be understood that in the embodiment herein disclosed, my device consists of a downwardly curved handle 7, which terminates in an arcuate member 8, which gradually tapers to the rounded end 9, (Fig. 2). The end 9 terminates at a point slightly beyond the median line of the handle 7, so that the device may be sprung about the neck of the milk bottle to effect a tight grip.

Depending from the underside of the arcuate portion 8 at a point near the juncture with the handle 7, is a curved member 10, which serves as a fulcrum for the device to be easily broken away from the throat of the bottle by an inward rocking of the handle 7 on the member 10.

I prefer to form my improved device as a unitary structure by molding the same from a plastic material, although the device may be made of metal or a combination of metal and wood or any other suitable material.

Figure 5:
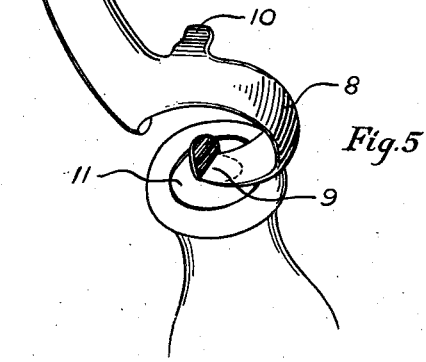
Fig. 5 is an enlarged perspective view of the device illustrating the manner in which it may be employed to remove a milk bottle cap.

In Fig. 5, I show the manner in which the tapered and rounded end 9 may be employed to pry off the cap 11 of the milk bottle.

Figure 1:
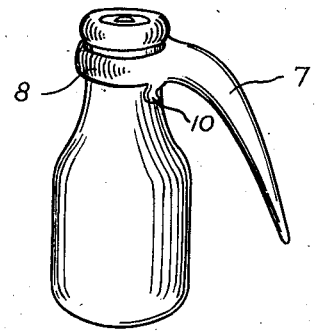
Fig. 1 is a perspective view of a milk bottle having attached thereto the device embodying my invention.

When the device is applied to a milk bottle as illustrated in Fig. 1, the bottle may be manipulated with ease for pouring the contents from the bottle. This obviates any possibility of the bottle slipping from the hand of a child, or anyone attempting to grasp the throat of the bottle with a wet hand.

Having described my invention what I claim and desire to secure by Letters Patent is:

In a device of the character described, the combination of a C-shaped resilient member, having an outwardly and downwardly directed handle secured to one end thereof, the C-shaped member being tapered from the handle toward its free end, there being a depending fulcrum element on one edge of said C-shaped member at the point of its greatest thickness.

ROY W. LESLIE.